United States Patent
Piepiorra et al.

(10) Patent No.: US 7,430,759 B2
(45) Date of Patent: Sep. 30, 2008

(54) METHOD AND COMPUTER SYSTEM FOR SECURING COMMUNICATION IN NETWORKS

(75) Inventors: Frank Piepiorra, Berlin (DE); Michael Maechtel, Munich (DE); Lutz Jaenicke, Berlin (DE)

(73) Assignee: Innominate Security Technologies AG, Berlin (DE)

( * ) Notice: Subject to any disclaimer, the term of this patent is extended or adjusted under 35 U.S.C. 154(b) by 448 days.

(21) Appl. No.: 10/486,108

(22) PCT Filed: Jul. 29, 2002

(86) PCT No.: PCT/EP02/08421

§ 371 (c)(1),
(2), (4) Date: Jun. 28, 2004

(87) PCT Pub. No.: WO03/015369

PCT Pub. Date: Feb. 20, 2003

(65) Prior Publication Data

US 2004/0260943 A1 Dec. 23, 2004

(30) Foreign Application Priority Data

Aug. 7, 2001 (DE) ............... 101 38 865
Jun. 3, 2002 (DE) ............... 102 24 661

(51) Int. Cl.
*G06F 9/00* (2006.01)
*G06F 15/16* (2006.01)
*G06F 17/00* (2006.01)

(52) U.S. Cl. ............... 726/11; 713/153; 713/154

(58) Field of Classification Search .......... 726/11; 713/153, 154

See application file for complete search history.

(56) References Cited

U.S. PATENT DOCUMENTS 5,742,905 A * 4/1998 Pepe et al. ............... 455/461

(Continued)

FOREIGN PATENT DOCUMENTS

WO    WO 01/43393 A    6/2001

OTHER PUBLICATIONS

Signal Magazine, Cyberguardian Keeps Hackers, Insider Threats at Bay, Jun. 2001, Signal, <http://www.securecomputing.com/pdf/HK_Cyber_June_exp.pdf>.*

(Continued)

*Primary Examiner*—Nasser Moazzami
*Assistant Examiner*—David Garcia Cervetti
(74) *Attorney, Agent, or Firm*—Muncy, Geissler, Olds & Lowe, PLLC (57) ABSTRACT

A method and a computer system for securing communication in networks of data processing units which can be used especially for individually created security units for portable computer systems. In order to secure the communication, the data exchange between a data processing unit to be protected and the network is monitored and/or controlled by means of a computer program which is implemented in a security computer system as embedded software, the security computer system being inserted between the data processing device to be protected and the network. A computer system providing such protection is embodied as a single board computer or as a chip solution and comprises means for exchanging data with the data processing unit to be protected, means for exchanging data with the network, and means for monitoring and/or controlling the communication between the data processing unit to be protected and the network.

30 Claims, 7 Drawing Sheets

U.S. PATENT DOCUMENTS

| | | | | |
|---|---|---|---|---|
| 5,896,499 | A * | 4/1999 | McKelvey | 726/11 |
| 5,935,245 | A * | 8/1999 | Sherer | 726/13 |
| 5,968,176 | A * | 10/1999 | Nessett et al. | 726/11 |
| 6,003,133 | A * | 12/1999 | Moughanni et al. | 726/4 |
| 6,067,595 | A * | 5/2000 | Lindenstruth | 710/307 |
| 6,092,202 | A * | 7/2000 | Veil et al. | 726/27 |
| 6,141,757 | A * | 10/2000 | Seeker et al. | 726/22 |
| 6,157,955 | A * | 12/2000 | Narad et al. | 709/228 |
| 6,163,843 | A * | 12/2000 | Inoue et al. | 726/11 |
| H1944 | H * | 2/2001 | Cheswick et al. | 726/11 |
| 6,275,588 | B1 * | 8/2001 | Videcrantz et al. | 380/255 |
| 6,378,072 | B1 * | 4/2002 | Collins et al. | 713/187 |
| 6,401,117 | B1 * | 6/2002 | Narad et al. | 709/223 |
| 6,421,730 | B1 * | 7/2002 | Narad et al. | 709/236 |
| 6,704,871 | B1 * | 3/2004 | Kaplan et al. | 713/192 |
| 6,708,273 | B1 * | 3/2004 | Ober et al. | 713/189 |
| 7,003,118 | B1 * | 2/2006 | Yang et al. | 380/287 |
| 7,047,561 | B1 * | 5/2006 | Lee | 726/12 |
| 7,055,029 | B2 * | 5/2006 | Collins et al. | 713/161 |
| 7,073,069 | B1 * | 7/2006 | Wasson et al. | 713/189 |
| 7,120,799 | B2 * | 10/2006 | Leung et al. | 713/189 |
| 2002/0021804 | A1 * | 2/2002 | Ledzius et al. | 380/44 |
| 2002/0069356 | A1 * | 6/2002 | Kim | 713/160 |
| 2002/0075844 | A1 * | 6/2002 | Hagen | 370/351 |
| 2002/0078342 | A1 * | 6/2002 | Matthews, Jr. | 713/151 |
| 2002/0078348 | A1 * | 6/2002 | Leung et al. | 713/164 |
| 2002/0083344 | A1 * | 6/2002 | Vairavan | 713/201 |
| 2002/0108048 | A1 * | 8/2002 | Qi et al. | 713/189 |
| 2003/0061381 | A1 * | 3/2003 | Brisebois et al. | 709/245 |
| 2003/0126468 | A1 * | 7/2003 | Markham | 713/201 |
| 2003/0231649 | A1 * | 12/2003 | Awoseyi et al. | 370/463 |
| 2004/0059943 | A1 * | 3/2004 | Marquet et al. | 713/201 |
| 2004/0093520 | A1 * | 5/2004 | Lee et al. | 713/201 |
| 2006/0174336 | A1 * | 8/2006 | Chen | 726/11 |

OTHER PUBLICATIONS

3COM, Embedded Firewall, Aug. 2001, 3COM, <http://www.3com.com/other/pdfs/products/en_US/103003_001.pdf>.*

Ganger et al., Enabling Dynamic Security Management of Networked Systems via Device-Embedded Security, Dec. 2000, Carnegie Mellon University.*

Ganger et al., Better Security via Smarter Devices, May 2001, IEEE.*

LANQuest, Competitive Performance Testing of IPSec Encryption (3DES) Capable Ethernet Adapters, Mar. 2000, LANQuest Labs.*

3COM, 10/100 PCI NICs with 3XP Processor, Jul. 2000, 3COM.*

3COM, EtherLink® 10/100 PCI Network Interface Card with 3XP processor User Guide, Aug. 1999, 3COM.*

Innominate ComServer M2 Mini, Innominate, 2002.*

Signal Magazine, Cyberguardian Keeps Hackers, Insider Threats at Bay, Jun. 2001, Signal, <http://www.securecomputing.com/pdf/HK_Cyber_June_exp.pdf>.*

3COM, Embedded Firewall, Aug. 2001, 3COM, <http://www.3com.com/other/pdfs/products/en_US/103003_001.pdf>.*

3COM, 10/100 PCI NICs with 3XP Processor, Jul. 2000, 3COM.*

3COM, EtherLink® 10/100 PCI Network Interface Card with 3XP processor User Guide, Aug. 1999, 3COM.*

* cited by examiner

METHOD AND COMPUTER SYSTEM FOR SECURING COMMUNICATION IN NETWORKS

The invention concerns a method and a computer system for safeguarding communication in networks which can be applied especially for individually installed safety facilities for mobile computer systems, where the safety is effected by the integration of an embedded hardware and software system into the communication interface of the data processing facility to be protected.

Known safety solutions for Firewalls, Virtual Private Networks (VPN) or virus protection solutions are realised in two ways:

In the first approach, software solutions are installed in the operating system of the computer to be protected. In this case, the required programs must be executed by the main processor as based on the system itself. Any required secret key data must be available to the software, as subject to principle. For this reason, both the software as well as the keys are not to be protected against unauthorised access on the part of the user or from programs (here in particular harmful software such as viruses or Trojan Horses).

A mobile user, such as a travelling businessman, is faced with the problem to the effect that he, under certain circumstances, has to constantly change the Provider of an Internet access in order to be able to communicate quickly and economically by way of the Internet. As a rule, he does not know if and which safety precautions are made available by the local Provider of the Internet access and he must therefore provide for his own protection. Up to now, this can only be done by the mobile user having corresponding software on his mobile equipment which he then has to adapt to the conditions of the individual Network Provider as required. The configuration is, as a rule, an assignment which can only be performed by specially trained personnel and must be repeated for each new (mobile) piece of equipment.

The second approach is characterised in that hardware solutions in form of external computers (in which again special safety software is installed) are realised which are either specifically introduced into the network connection of the computer to be protected or are made available by the Provider of the network connection (and usually also administrated by the Provider).

However, it is characteristic for both approaches that the configuration which is required for effective protection is too much for a non-professional to cope with. Based on the particular complexity of a secure network connection, many users are not capable of performing secure and reliable configuration on their computers and to set up the standard system for the safety functions. It is therefore necessary to have these settings specified by a specially trained administrator. For software solutions, as applied in the first approach described above, one important aspect among others cannot be ascertained: it should be impossible for the user to change unintentionally or intentionally the safety settings as selected by the administrator, and/or it should also be impossible for any harmful functions on the client-computer to change safety settings or to call up secret key data. Solutions which have been previously realised in software have the problem that their configuration is frequently incorrect and that other software running on the computer to be safeguarded can have unintentional influences. The overall system is then in a non-defined and, subsequently, insecure condition.

A safety software configured by a user provides no protection whatsoever in the event of faulty configuration. For this reason, it offers only a deceptive security. Software which should ensure security must therefore be configured by an Administrator who is specially trained for assignments in this particular field. These requirements with software solutions cannot be ascertained. For this reason, the use of an own software/hardware solution is necessary, as already mentioned in the second approach described above.

With a software/hardware solution made available by the Provider of the network connection, it is not ascertained if the Provider has carried out the safety settings correctly and in the requested scope. In addition there is the possibility that, for example with the connection of a mobile computer system (laptop, PDA) in an external network, the local area of the computer network is protected against outer access by a safety system (Firewall), but no safety precautions are envisaged within a closer environment (e.g., within a work group in a company network).

A further disadvantage of the previously applied solutions is the fact that access authorisations are often person-related. The result here is that an actually authorised person in some cases receives no access to data from a computer whose safety functions are not specially configured for him, even though he would most certainly have access authorisation.

For the reasons stated above, the invention is based on the task assignment of creating a safety solution which avoids the disadvantages as already stated, particularly an additional configuration of special hardware or software on user computers (clients), thus eliminating the danger of unintentional influence of the safety software by other software installed by the client. In addition, and by means of the invention, a flexible and client-based protection of computer systems is to be made possible and a solution is to be made available which allows that safety-relevant data are stored separately from the client, therefore being protected against access from the direction of the client.

This task assignment is solved according to the invention by the features in the designating part of the claims 1 and 19 in the interaction with the features in the generic term. Purposeful embodiments of the invention are contained in the Subclaims.

An advantage of the method for safeguarding the communication in networks with the intermediate arrangement of a safety computer system between a data processing facility to be protected and the network lies in the fact that an effective defence against harmful access to or intervention in the data processing facility to be protected is achieved where the data exchange between the data processing facility to be protected and the network is monitored and/or controlled by at least one computer program, according to a pre-specified set of rules, implemented as embedded software on the safety computer system.

A computer system for safeguarding the communication in networks, which realises this protection, is advantageously constructed in such a way that the computer system is designed as a single board computer or as a chip solution and encompasses at least one means for data exchange with a data processing facility to be protected, at least one means for data exchange with the network and at least one means for monitoring and/or control of the communication between the data processing facility to be protected and the network. Preferentially envisaged in this case is that a means for data exchange is connectable with a protection-requiring data processing facility to the bus-system of the protection-requiring data processing facility and/or a means is executed for data exchange with the network as a network interface.

A further advantage of the method for safeguarding the communication in networks of data processing facilities is to be seen in the fact that the safety computer system is connected with the bus system of the protection-requiring data processing facility and a connection between the protection-requiring data processing facility and the network is established by way of an interface of the safety computer system.

A preferred embodiment form of the method according to the invention envisages that the pre-specified set of rules for the monitoring and/or the control of the data to be exchanged between the protection-requiring data processing facility and the network covers person-related rules and/or rules individually pre-specified for the protection-requiring data processing facility.

A further advantage is to be seen in the fact that the individually pre-specified set of rules examines the authorisation for access from source systems to the protection-requiring data processing facility and/or examines the authorisation for access on target systems from the direction of the protection-requiring data processing facility and/or realises the encryption and the decryption, respectively, of the data to the exchanged, and/or performs the build-up of a virtual private network (VPN) and transmits transparently the data to be exchanged through the VPN-channel, and/or analyses the contents of the data to be exchanged. The analysis of the data to be exchanged in this case serves, among other things, the purpose of detection of viruses and/or Trojan Horses. The best possible protection is, of course, then obtained if all data to be exchanged between the protection-requiring data processing facility and the network run through the safety computer system.

Moreover, it is seen as an advantage that the build-up of a VPN is effected after successful authentification and not before.

A further preferred embodiment form of the method according to the invention envisages that the configuration of the safety computer system and/or the embedded software is effected to the network by way of an interface. It is furthermore envisaged that the maintenance and/or care administration of the safety computer system is effected from the protection-requiring data processing facility or as remote maintenance via the network. As required, the maintenance and/or care administration of the embedded software covers the extension of the functionality of the computer program implemented as embedded software.

The safety computer system and the safety settings, respectively, on this system are advantageously secured in such a way that the computer program monitoring and/or controlling the data to be exchanged between the protection-requiring data processing facility and the network is not changeable from the side of the protection-requiring data processing facility or is only changeable after authentification.

A particularly uncomplicated administration then results when the safety computer system appears transparent for the protection-requiring data processing facility and/or the network. An additional safety level can be achieved in such a way that the safety computer system is not transparent but rather establishes its own private partial network on the side of the protection-requiring data processing facility and, from the direction of the network, only the safety computer system is visible.

It is particularly advantageous with mobile equipment that the safety computer system as an embedded system is integrated in the communication interface of the protection-requiring data processing facility. This can be done by integrating the safety computer system as an insertion card or as a PCMCIA-card in the protection-requiring data processing facility. In an advantageous manner in the case of mobile equipment, the power supply of the safety computer system is effected by way of the protection-requiring data processing facility. In addition, the deployment of the safety computer system according to the invention is facilitated in such a way that it is connected in a way as for commercially available network connection hardware to the protection-requiring data processing facility.

The safety of the protection-requiring data processing facility is particularly increased by the fact that strictly confidential data such as electronic keys or electronic signatures only exist on the safety computer system. An additional increase in safety is achieved by the fact that strictly confidential data on the safety computer system, from the side of the protection-requiring data processing facility, cannot be changed or can only be called up after entry of a password.

In dependence on the interfaces of the protection-requiring data processing facility, the safety computer system is advantageously executed in such a way that it has a means for data exchange with a protection-requiring data processing facility, which is formed as a PCMCIA-bus or as a PCI-bus or as a USB-bus or as a IEEE 1394-bus (Firewire) or even as an RS-232-interface or as an Ethernet interface or as a USB-interface.

In a preferred embodiment form of the computer system according to the invention, it is additionally envisaged that at least one means for data exchange with the network includes a modem and/or a mobile telephone processor.

In addition, it is an advantage that at least one means for monitoring and/or control of the communication includes a Firewall and/or an intrusion detection system and/or a public key management.

In order to obtain the highest possible degree of miniaturisation, it is envisaged in a preferred embodiment form of the computer system according to the invention that the computer system is formed as a system on chip.

A user-friendly handling is achieved in such a way where the safety computer system is integrated in a cable or a card or a chip for the network access, or is formed as an insertion card or as a PCM CIA-card.

By means of the fact that the safety device belongs to the protection-requiring data processing facility and takes over its special protection, and is at the same time as an embedded system an independent unit not influenced by errors on the side of the client system or his user, a best possible protective effect is ensured.

It is an advantage in that the system appears completely transparent for the user and, for the simplification of the handling, is connected with the protection-requiring data processing facility in such a way that it is integrated into this and can be connected up to the network by the user in such a manner as normal network connection hardware would be connected.

Further advantages of the invention in contrast with a pure software solution on the client, such as for example a PC or mobile equipment (Notebook, PDA or similar) are that, by means of the invention, the client is protected against direct access from the Internet because, with a corresponding configuration, he receives no address that can be reached from the Internet. The configuration data for the Internet-/Intranet access are located on the computer system according to the invention and not on the client. Therefore, the data cannot be copied or changed by the user.

In the invention, there is an embedded hardware and software system available which the user cannot change and which he does not have to change at all. The problem of the former software solutions, to the effect that they are frequently not correctly configured because of the high degree of complexity of the systems and/or due to insufficient competency of the Administrator, or that other software can have unintentional influences, is therefore eliminated by the invention.

The invention unifies a Mini-Firewall and a VPN in one equipment unit. The user is not required to do the complex configuration of such a system. This is done only by the Administrator and a high safety level is achieved in the process.

All keys (keys, passwords) as well as person-specific information are safely stored on the hardware of the embedded hardware and software system which is independent of the client. Subsequently, this information does not have to be kept on the client. This separation—there are two different operating systems here—also leads to the situation where the entire safety is elevated to a significantly higher level status than if all software were located on one system alone. This principle of different operating systems is applied in particular for multi-stage Firewalls for the purpose of achieving effective protection against attacks.

The configuration of the embedded hardware and software system can be carried out remotely by way of a secure channel. In this case, the Administrator only has to take care of the configuration of one software because the embedded hardware and software system is independent of the operating system of the (mobile) equipment unit to be protected.

Up to now, and for each operating system in use (Unix, MacOS, Windows, . . . ), an Administrator had to know which software is available for what purpose of safeguarding (Firewalling/VPN), and he also had to know how this software has to be configurated.

The invention is to be explained as follows in greater detail by an embodiment, illustrated at least in part in the Figures.

Figure 1:
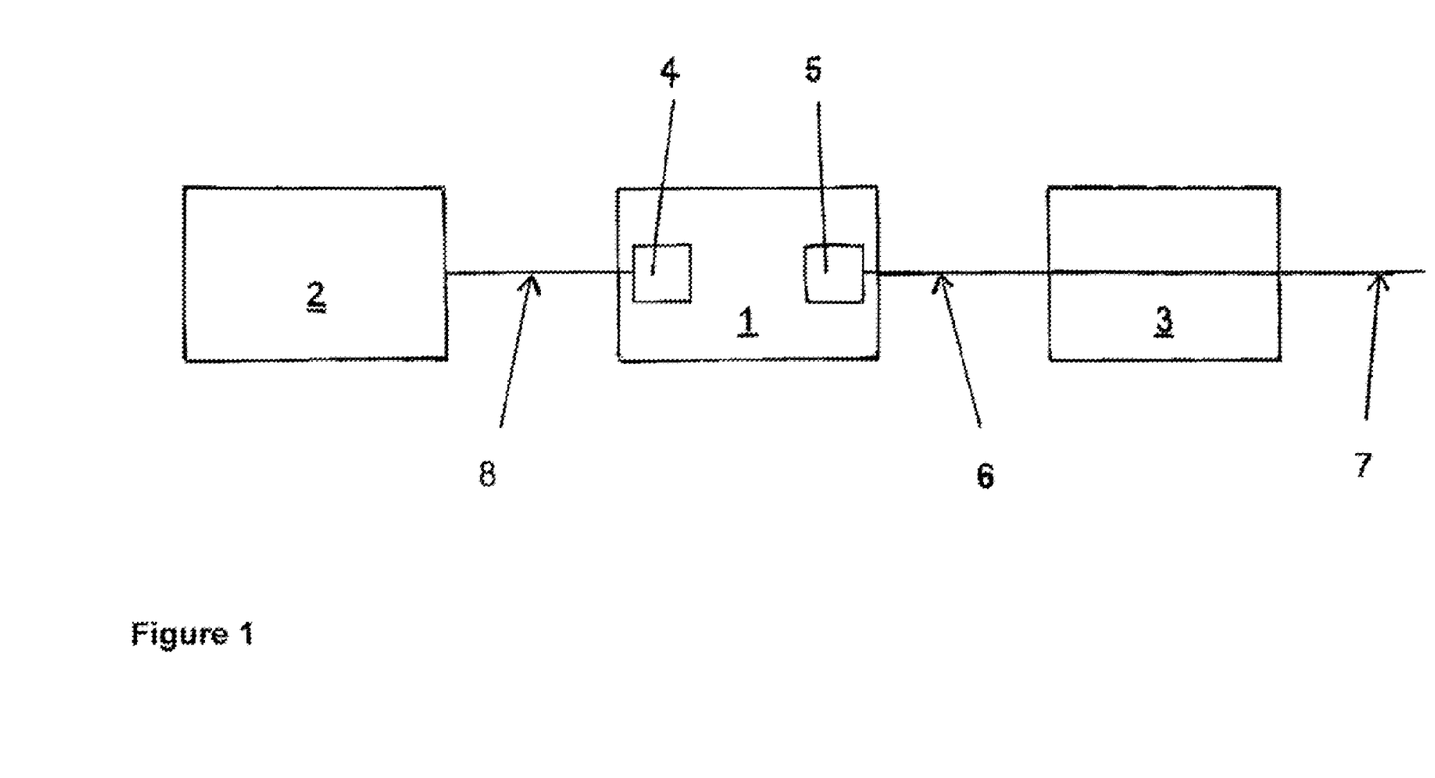
FIG. 1: Arrangement of the computer system for a connection of a client to a communication network.
Figure 2:
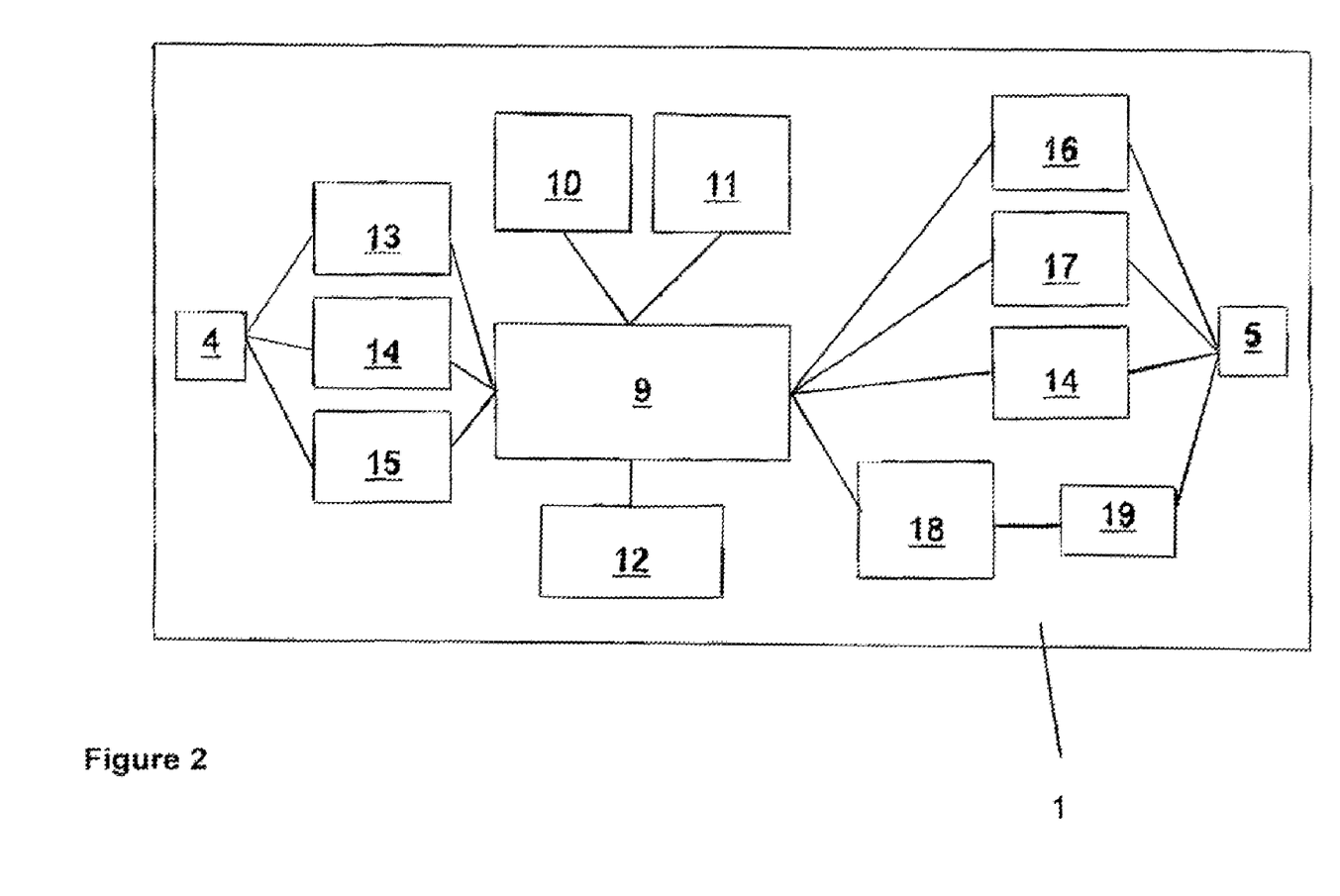
FIG. 2: Block diagram of the hardware module of the computer system.

Modern embedded systems (single-board computers) are characterised in that they can be minitiaturised to a considerable degree. A particular compact arrangement are the so-called systems on chip. The dimensions of the computer systems reduce by a further order of magnitude when the methods are executed as a chip solution in one single chip. An exemplified execution of the invention can therefore be that an embedded hardware and software system 1 is adopted which is executed as system on chip or as a chip solution where, because of the small structural form (chip size), it can be easily integrated into a PCMCIA-card or a (mobile) telephone equipment unit. In this way, the invention is also deployable if, for the access to a network, interfaces such as WLAN (wireless local area network), GPRS (general packet radio services) or UMTS (universal mobile telecommunications systems) are used or when a pay-card is to be applied with networking services where fees are demanded. According to the invention and for the purpose of safeguarding communication in networks, the safety computer system is installed as an embedded hardware and software system 1 between the client computer 2 and the network 45 (compare FIG. 1). In a preferred embodiment form, the invention is executed in such a way that the physical size of the embedded hardware and software 1 allows an implementation in a cable or similar. The embedded software is advantageously configurated in such a way that it provides safety functions which do not influence the connected client (e.g., a mobile equipment item) and the Internet access with regard to their respective functions and, from these, are also not evident from the communication protocol. The principle physical construction is shown in FIG. 2. An exemplary embodiment form of the embedded hardware and software system 1 includes, for example, as a hardware module a processor 9, a RAM 10, a Flash ROM 11. It is evidently purposeful that at least the most common interfaces for the communication in networks are supported by the embedded hardware and software system 1.

Figure 5:
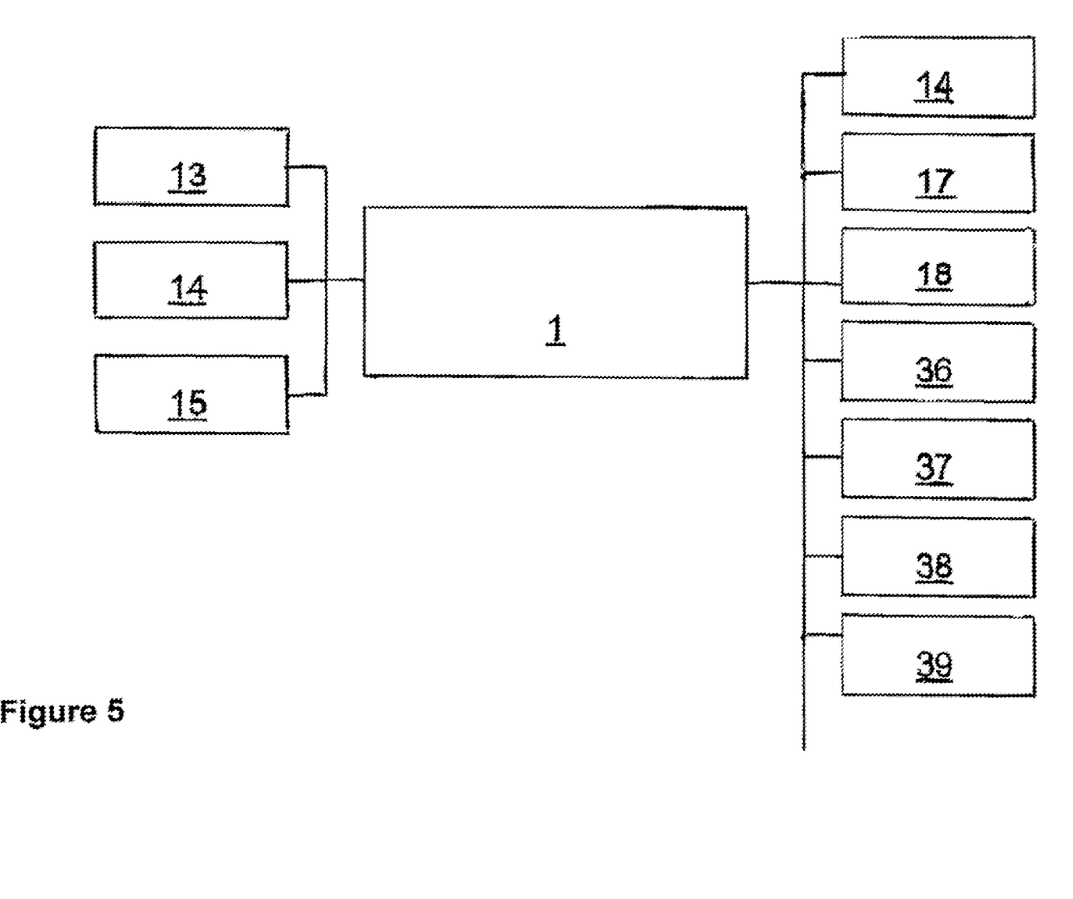
FIG. 5: Illustration of exemplified interfaces of the computer system.

The client 2 (Notebook, PC etc.) can, for example, be connected up by way of the following interfaces 4 (refer also to FIG. 5):

RS-232-interface 13,
Ethernet-interface 14,
USB-interface 15.

This is the most common approach. The embedded hardware and software system 1 can, however,—as shown further down in greater detail—also be connected with the client computer 2 by way of the bus system 43. In this case, various bus systems 43 would have to be supported, such as:

as PCMACIA-bus or
as PCI-bus or
as USB-bus or
as IEEE 1394-bus (Firewire).

The embedded hardware and software system 1 should make available several interfaces 5 on the server side for the connection to the Internet 6:

IRDA-interface 16,
Bluetooth-interface 17,
Ethernet-interface 14 (e.g., ADSL),
RJ 45-interface 19 (for the connection to the telephone network via a modem 18).

In addition, further interfaces can be envisaged, as illustrated in FIG. 5:

a modem 18,
a UMTS-interface 36
a DSL-interface 37
a GPRS-interface 38 and/or
a POT-interface 39.

If required, a power supply 12 can be envisaged.

Figure 3:
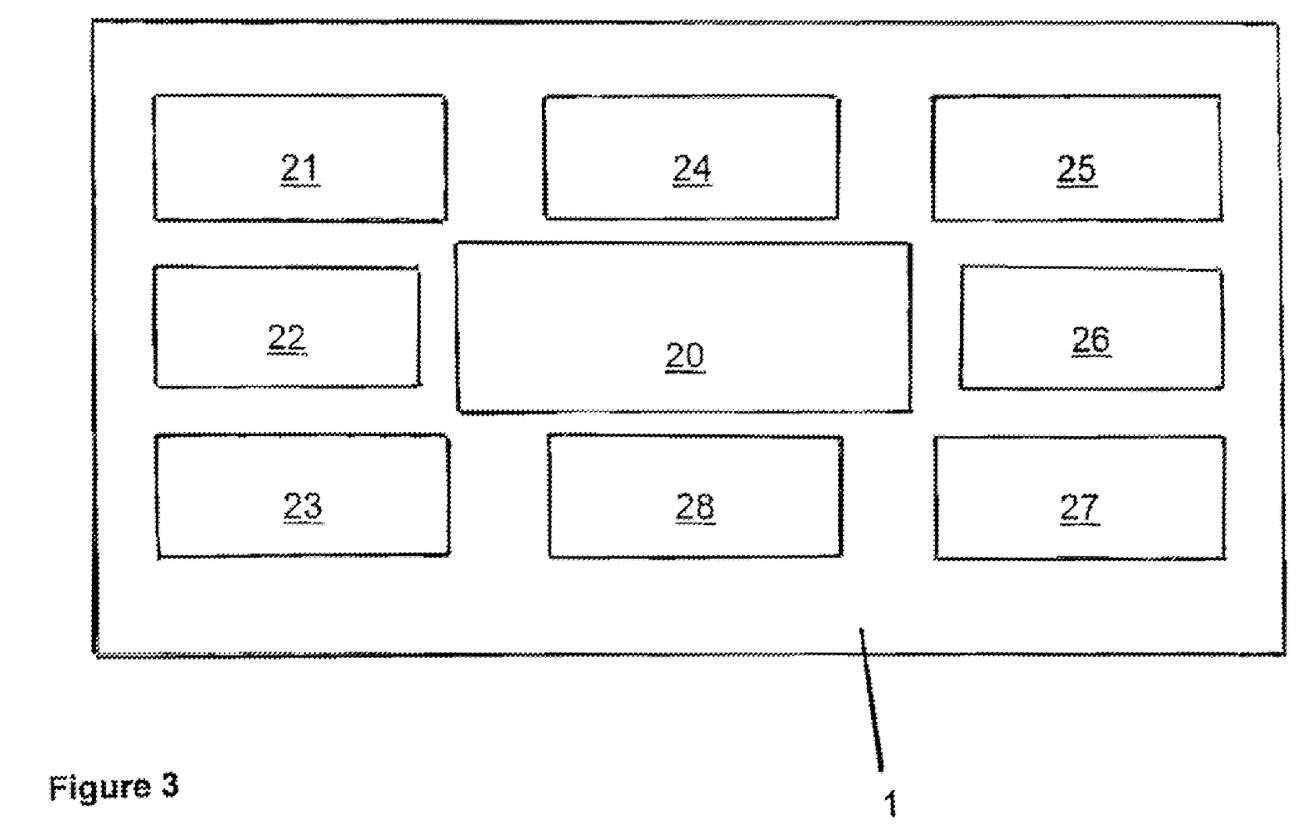
FIG. 3: Software components installed on the processor of the computer system.

These listings are not to be regarded as being final. Interface protocols to be newly developed should be purposefully integrated into the embedded hardware and software system 1. The hardware solution is designed in such a way for minimalisation—also in the sense of the minimality principle of the computer safety—that only the necessary resources (CPU, memory) are applied which are necessary for the operation of an embedded operating system. The embedded operating system and the system programs necessary for the individual functionality support safety tasks in such a way that all safety functions are implemented to such an extent that no changes on the client 2 or at the Internet access are necessary. A configuration of the safety software can only be performed by the system administrator who has a higher degree of training in this field than an normal user. The embedded hardware and software system 1 is then in a position to ensure the safety of the equipment (client 2), to be protected and located behind, without the user having to or being able to intervene in the configuration of the software required for safety purposes. The embedded hardware and software system 1, when connected to an external network (e.g., the Internet 6), takes over the Firewall functionality required for client 2 and is available at the same time as a server for the communication of client 2 by way of a VPN to the internal company network (Intranet 7). By means of the spatial separation of the hardware and software, as used for working purposes, from the Firewall and VPN software as required for safety purposes and located on a "hardened" operating system, the safety of the computer to be protected (client computer 2) is substantially higher than if all programs were running on one machine. The term "hardened" operating system is understood to mean an operating system which is reduced to the absolutely necessary functionality. Where computer safety is concerned, the principle of minimality applies: the less software available on one equipment unit, the less the susceptibility to safety-relevant errors in the software which can make an attack possible. On the other hand, the prevention of the configuration by a user, who could detrimentally affect the safety of essential parts of the equipment to be protected by means of an unintentional faulty configuration, is also only possible with the spatial separation of the components "work" and "safety".

Where the method according to the invention is concerned, the communication for example between a mobile piece of equipment (client 2) and the Internet 6 is established by means of the embedded hardware and software system 1. The necessary and optionally possible software components are shown in FIG. 3. For a basis system in this case, the transparent router/VPN (e.g., IPSEC) 20, the DHCP 23, the key management 25, the Firewall 26 and the remote control 27 are to be regarded as being necessary modules. Further modules such as a system monitoring, IDS 22, an automatic update 24 and further optional software modules 28 can, of course, be included; they serve the functionality extension which can, for example, be implemented as virus scanners for E-mails.

Figure 4:
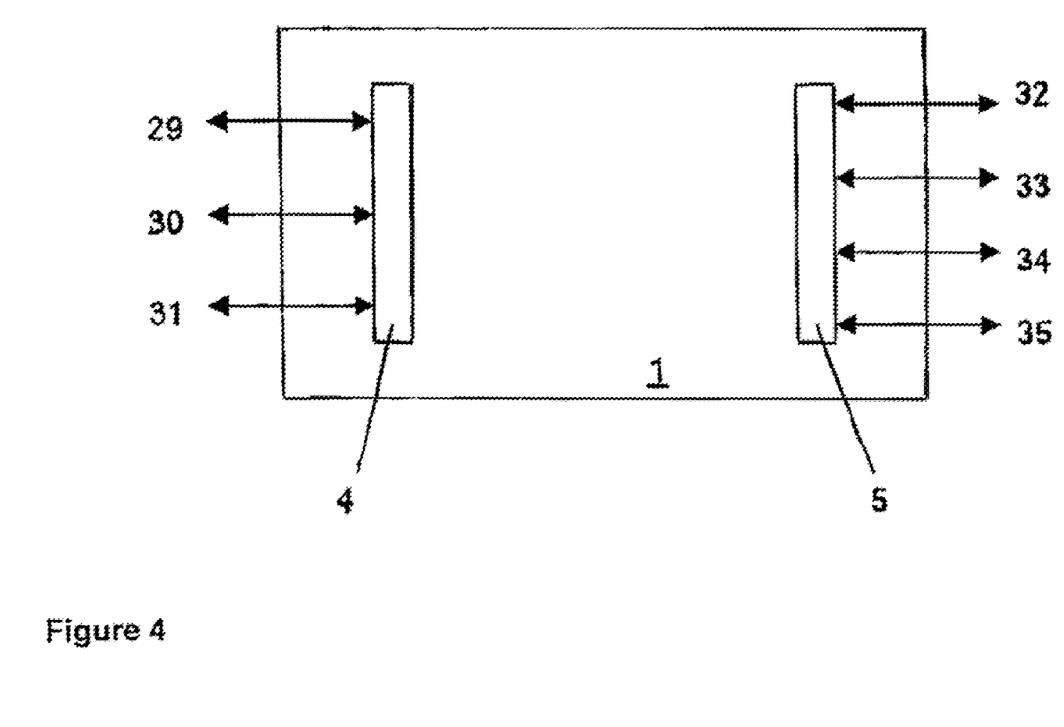
FIG. 4: Illustration of the client- and the server-side data flows, respectively

There is no direct data flow between the client 2 and the Internet 6 with the use of the invention. Rather, a communication connection 8 between the client 2 and the embedded hardware and software system 1 is established, as well as separately between the embedded hardware and software system 1 and the Internet 6. The split-up arrangement of the data flows is shown in FIG. 4.

Essential components of the client-side data flow are, for example:
the connection set-up 29 to the client 2,
the exchange 30 of non-encrypted data and
the exchange 31 of the IP-addresses.

Server and/or network-side, the data flow contains for example:
the connection set-up 32 to server 3,
the data exchange 33 to the management,
the data exchange 34 to the configuration of the embedded hardware and software system 1 and
the data exchange 35 upon update of the embedded hardware and software system 1.

The system administrator configurates the embedded hardware and software system 1 and sets here, for example with the use of a VPN, the following parameters:
X.509 certificate for the embedded hardware and software system 1 and Private Key,
X.509 certificate of the company using the VPN,
Address of the network behind the VPN Gateway of the company,
Address of the VPN Gateway of the company.

If the user uses the embedded hardware and software system 1 for the communication in a network 45, a connection is established (e.g., by means of the DHCP-server 23 of the embedded hardware and software system 1) between the mobile equipment (client 2) and the embedded hardware and software system 1. In addition, a connection is established between the embedded hardware and software system 1 and the Internet 6, where the VPN and the Firewall 26 are activated.

The embedded hardware and software system 1 and a special server 3 within a company, which applies the VPN, serve as end-points of the VPN in this case. Either the server 3 is characterised as an Internet access for the company or the IP packages are tunnelled (VPN end-points) through the existing Internet access to the server 3 by the embedded hardware and software system 1. In addition, the server 3 is responsible for the configuration of the embedded hardware and software system 1. If a client 2 registers at server 3 by way of the embedded hardware and software system 1, the SW-status of the embedded hardware and software system 1 is checked and renewed as required (automatic update). Furthermore, the server 3 is necessary for the dedicated access control to the company-internal resources.

If the VPN, for example, is realised with the IPsec-protocol, the VPN by way of the UDP port 500 processes the key exchange with the pre-configured VPN Gateway of the company. Following successful key exchange, IP packages of type 50 (ESP) (these are the encrypted IP packages) are exchanged between the embedded hardware and software system 1 and the VPN Gateway. Which IP packages the embedded hardware and software system 1 must encrypt and channel to the VPN Gateway is recognised by this by way of the pre-configurated address of the network behind the VPN Gateway of the company which is, computer-technically, an entry in the routing table on the virtual IPSec device.

After this, the VPN-connection is established; a controlled and protected access to the company Intranet 7 as well as to the Internet 6 can take place. The embedded hardware and software system 1, subsequently, can be integrated transparently into the connection route between the client 2 and the Internet 6. From the point of view of the mobile equipment (client 2) the embedded hardware and software system 1 already represents the modem 18 or the LAN connection to the Internet 6. Specific software adaptations on the mobile equipment are not necessary.

The Firewall 26 protects the client 2 in two ways. It not only acts as a package filter, but it also masks the IP-address of the client 2. These two functions of the Firewall 26 serve the purpose of making attacks difficult on client 2.

The Firewall 26 acts as a package filter in the following manner: the Firewall 26 makes possible an initialisation of connections via TCP, only from the client 2 requiring protection. Initialisations from the other direction, meaning initialisations of connections to the client 2, are admitted only with limitations at the Firewall 26, or generally rejected, and subsequently prevent an undesirable data exchange. Connections by way of the UDP (User Datagram Protocol) are only admitted via the ports which are necessary for the communication of the client 2 with the Internet 6 and the internal company network (Intranet 7). Also packages which use the protocol ICMP (Internet Control Message Protocol) are allowed through the Firewall 26, but only restricted to absolute necessity.

On the use of the masking: the IP-address which the Firewall 26 receives when dialling-in via a telephone line into the Internet 6 is presently dynamically given on the part of the internet provider. That means that the provider gives the dialling-in machine an IP-address which can change from dial-in to dial-in. A fixed IP-address, which does not change from dial-in to dial-in, is only obtainable from some providers. When using the embedded hardware and software system 1, that particular IP-address appears to the outside which has been allocated to the Firewall 26 by the provider. The IP-address of the client 2 remains undisclosed to the outside. By means of the fact that the IP-address of the client 2 does not appear to the outside, attacks are also substantially more difficult to carry out because knowledge of the IP-address of the computer is necessary for any targeted attack on it.

As follows, the invention is described on the basis of a further embodiment form. In this embodiment form, the protective function is also achieved in that an additional computer system is installed which is also advantageously realised as an embedded system or, alternatively, as a one-chip solution. A particular user-friendliness is achieved where the embedded system in built into the client system 2 in such a way that it appears transparent for the client system 2, therefore for the user in operating there is no difference compared with a normal network connection.

Figure 8:
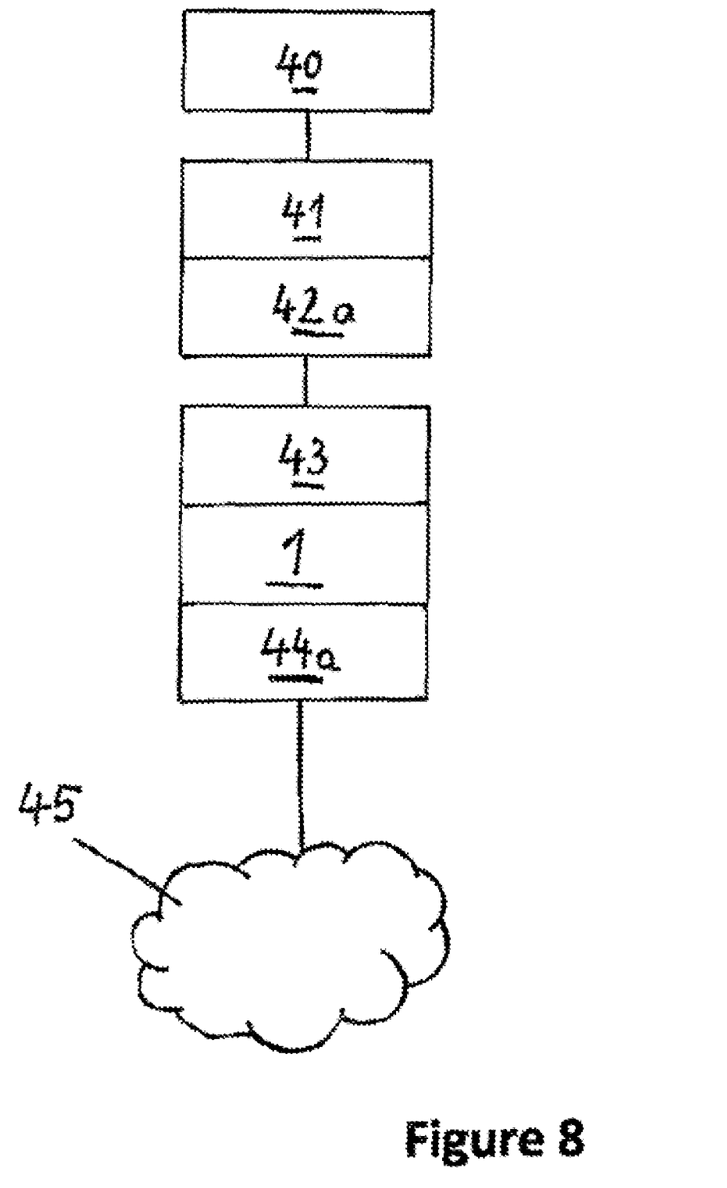
FIG. 8: A principle illustration for a safety solution with the use of a safety system (hardware and software) located between bus system and network interface.

By contrast with the interconnection of the equipment normally carried out, in this embodiment example the safety system is installed as an embedded hardware and software system 1 between the bus system 43 and the network interface 44a (compare FIG. 8), where the network interface 44a is now operated from the embedded hardware and software system 1.

As follows, the difference to the previous embodiment example and the conventional approach is to be clarified in greater detail.

Figure 6:
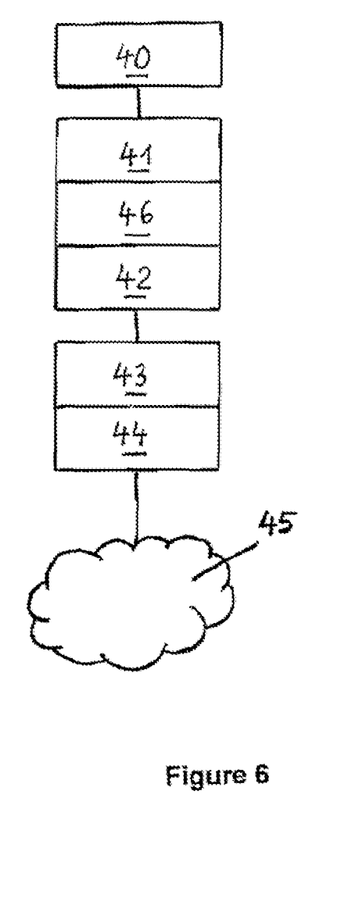
FIG. 6: A principle illustration for a safety solution where the safety functions were installed in the operating system of the computer to be protected.
Figure 7:
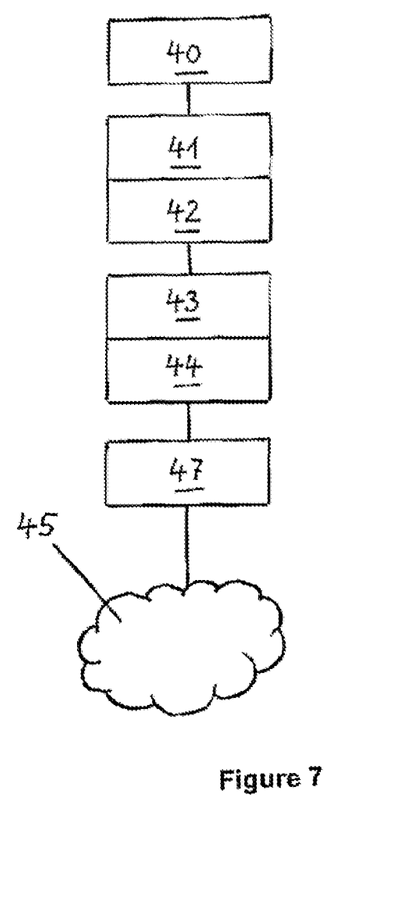
FIG. 7: A principle illustration for a safety solution with the use of external safety hardware (e.g., Firewall)

Conventional Structure:
40 User application
41 Operating system
42 Hardware-specific driver (e.g. for the network interface)
43 Bus system
44 Network interface hardware
45 Network (e.g., Internet 6 or Intranet 7)
New Structure:
40 User application
41 Operating system
42a Hardware-specific driver, tuned to the embedded system according to the invention
43 Bus system
1 Embedded hardware and software system
44a Network interface hardware
45 Network With the use of the conventional structure, the operating system 41 uses a hardware-specific driver 42 which is specifically tuned to the network interface hardware 44. Here, the hardware-specific driver 42 must map the requirements of the operating system 41 onto the individual hardware 44. The programming interface between the operating system 41 and the hardware-specific driver 42 is, however, dependent on the operating system, but it is standardised for the individual operating system 41 in each case. With this, the chain "hardware-specific driver 42—bus system 43—network interface hardware 44" appears the same in each case for the operating system 41, independent of the selected components. With this conventionally applied structure, the safety functions (software) 46 installed in the operating system 41 of the protection-requiring computer (client computer 2) are before this chain "hardware-specific driver 42—bus system 43—network interface hardware 44" (compare FIG. 6). As an alternative to this, the application of external safety hardware 47, such as the use of Firewalls, is known. In this case, the safety system is arranged behind this chain (compare FIG. 7).

With the deployment of the invention, an embedded hardware and software system 1 is now installed between the bus system 43 and the network interface 44a (compare FIG. 8), where the network interface 44a is now operated from the embedded hardware and software system 1. The driver 42a is realised here in such a way that it is suitable for the interface of the embedded hardware and software system 1. Subsequently, the installed embedded hardware and software system 1 appears fully transparent for the operating system 41. The operating system 41 and the user applications 40 (and all other harmful programs such as viruses and Trojan Horses) cannot therefore disturb the protection functions of the embedded hardware and software system 1. Settings for the protection cannot be changed. Secret information such as electronic keys exist only on the embedded hardware and software system 1 and cannot be called up or changed from client computer 2.

If the embedded hardware and software system 1 is installed in the described manner between client computer 2 and network 45, all data packages that leave or enter the client computer 2 run through the embedded hardware and software system 1 and can be inspected according to the set of rules on the embedded hardware and software system 1.

In this case, it can be ascertained by the examination of the passage flow direction of the data package as well as of the sender and receiver addresses that:

no data packages of an incoming connection are allowed through and/or only such connections can be set-up that are allowed in the set of rules, so that the client computer 2 is protected against attacks from the network 45;

only the data packages of an outgoing data connection are allowed through, whose set-up is allowed in the set of rules.

Furthermore, those particular packages from the sender and target addresses can be detected whose target can be attained by way of an optional VPN. In this case, these packages can be transmitted transparently through the VPN-channel. It is, however, recommended here to carry out the set-up of the VPN after authorisation by the user (e.g., with a password) in order to avoid an unauthorised dial-in into the VPN—in a case where the safety computer system is lost.

Furthermore, the exemplary safety computer system is to be designed as an embedded system in such a way that, in the normal operation case, no configuration can be exchanged by way of the interface bus system 43—embedded hardware and software system 1 except for the data which is technically required for the operation of the network interface hardware 44a. This safety feature is ascertained by the embedded hardware and software system 1 because the characteristics of the user programs 40, the operating system 41 and a driver 42 and/or 42a by the user or by means of harmful programs can be modified.

For setting the safety characteristics and further configuration of the embedded hardware and software system 1, a special configuration interface is therefore required where the administrator must authenticate himself opposite the embedded hardware and software system 1 (such as with a password or with the help of an electronic key, e.g. according to x.509 standard). For this purpose, the interface 4 from the side of the client computer 2 could be used by way of the chain "operating system 41 hardware specific driver 42a—bus system 43—embedded hardware and software system 1 tuned to the embedded system according to the invention" as also a remote maintenance by way of the chain "network 45—network interface hardware 44a—embedded hardware and software system 1.

With the arrangement, in this execution form, of the embedded hardware and software system 1 between the operating system 41 of the client computer 2 and the network 45, for safeguarding a client computer 2, the normally used network interface hardware 44 is replaced.

For this reason, the best possible protection effect for the client computer 2 is ensured in that the embedded hardware and software system 1 belongs to the client computer 2 to be protected and takes over its special protection, however at the same time representing as an embedded system an independent unit not influenced by errors on the part of the client computer 2 or his user.

Here, the embedded hardware and software system 1 should be fully transparent for the user and, in the sense of a particularly low expenditure, be connected with the client computer 2 in such a way that it is integrated in this as bet possible, or that it can be connected up by the user as a normal network hardware would be connected up. With a mobile computer as client computer 2, it is additionally particularly advantageous that the embedded hardware and software system 1 draws its power supply from client computer 2, where this feature would also be advantageous with a stationary client computer 2.

Depending on the client computer 2, various bus systems 43 are selectable. With a laptop, it could be the CardBus/PCMCIA-bus. It could just as well also be a PCI-bus, USB-bus, IEEE 1394-bus (Firewire) or another bus system 43 by way of which the operating system 41 is connected with the network 45. Network 45 describes a general connection of two or several computers, for example a connection to the Internet 6 by way of Ethernet hardware, by way of a wireless connection (wireless LAN) or another technical mode for network connections. The invention can be applied to all other network connections such as USB-USB-networks.

If the embedded hardware and software system 1 is integrated for example on a PCMCIA-card, and with corresponding person-related configuration of the rules and/or safety functions, this card can be issued as an authorisation card, with which the owner of various computers can use his specific rights.

With a corresponding configuration of the computer system and such authorisation cards, such an approach in large companies, for example, could simplify the safety precautions and increase the protection against unauthorised access to data.

The invention is not limited to the embodiment examples stated here. Moreover, it is possible to realise further embodiment variants by means of combination and modification of the means stated herein, without departing from the framework of the invention.

REFERENCE PARTS LIST

1. Embedded hardware and software system
2. Client
3. Server
4. Client interface
5. Server interface
6. Internet
7. Intranet
8. Communication between the client and the embedded hardware and software system
9. Processor
10. RAM
11. Flash ROM
12. Power supply
13. RS 232 interface (serial interface)
14. Ethernet interface
15. USB-interface
16. IRDA-interface
17. Bluetooth interface
18. Modem/ISDN module
19. RJ-45-interface
20. Transparent router/VPN (IPSEC)
21. System monitoring
22. IDS
23. DHCP
24. Automatic update
25. Key Management
26. Firewall
27. Remote control
28. Further optional software modules (such as virus scanners)
29. Connection set-up to client
30. Exchange of non-encrypted data
31. Exchange of the IP-addresses
32. Connection set-up to the server
33. Data exchange to the management
34. Data exchange to the configuration of the embedded hardware and software system
35. Data exchange during update of the embedded hardware and software system
36. UMTS-interface
37. DSL-interface
38. GPRS-interface
39. POT-interface
40. User application
41. Operating system
42. Hardware-specific driver (e.g. for the network interface)
42a. Hardware-specific driver, tuned to the embedded system according to the invention
43. Bus system
44. Network interface hardware
44a. Network interface hardware
45. Network
46. Installed safety functions (software) installed in the operating system of the computer to be protected.
47. External safety hardware

The invention claimed is:

1. Method for safeguarding the communication in a network with an intermediate arrangement of a safety computer system, realized as an embedded system including embedded hardware and embedded software, between a protection-requiring data processing facility and the network,
the method comprising the steps of:
monitoring and/or controlling data exchange between the protection-requiring data processing facility and the network by the embedded system,
wherein the embedded system is an autonomous unit including monitoring and/or control functions installed thereon, and
wherein all data required for correct execution of the monitoring and/or control functions installed on the embedded system are available on the embedded system, and
further comprising the step of:
establishing a connection for data transmission between the protection-requiring data processing facility and the network by the embedded system.

2. Method according to claim 1,
wherein the safety computer system is connected with a bus system of the protection-requiring data processing facility, and a connection between the protection-requiring data processing facility and the network is established by way of an interface of the safety computer system.

3. Method according to one of the claims 1 or 2,
wherein a pre-specified set of rules for the monitoring and/or control of the data to be exchanged between the protection-requiring data processing facility and the network is person-related and/or covers individually pre-specified rules on the protection-requiring data processing facility.

4. Method according to claim 3, the method further comprising the steps of using individually pre-specified set of rules for:
  examining the authorization for access from source systems to the protection-requiring data processing facility, and/or
  examining the authorization for access to target systems from a direction of the protection-requiring data processing facility, and/or
  realizing encryption and/or decryption of the data to be exchanged, and/or
  performing set-up of a virtual private network (VPN) and transmitting the data to be exchanged transparently through the VPN-channel, and/or
  analyzing contents of the data to be exchanged.

5. Method according to claim 4, further comprising the step of:
  setting up a VPN after successful authentication.

6. Method according to claim 4
wherein the step of analyzing the contents of the data to be exchanged serves the detection of viruses and/or Trojan Horses.

7. Method according to claim 1,
further comprising the step of configuring the safety computer system and/or the embedded software by way of an interface to the network.

8. Method according to claim 1,
further comprising the step of providing maintenance and/or care administration of the safety computer system
  from a direction of the protection-requiring data processing facility and/or
  as a remote maintenance via the network solely via a connection independent of an operating system of the protection-requiring data processing facility.

9. Method according to claim 1,
further comprising the step of providing maintenance and/or care administration of the embedded software via an extension of functionality of a computer program implemented as the embedded software.

10. Method according to claim 1,
further comprising the step of only changing a computer program monitoring and/or controlling the data to be exchanged between the protection-requiring data processing facility and the network from the side of the protection-requiring data processing facility
after set-up of a connection independent of an operating system of the protection-requiring data processing facility and subsequent authentication.

11. Method according to claim 1, wherein the safety computer system for the protection-requiring data processing facility and/or for the network appears transparent.

12. Method according to claim 1, wherein the safety computer system is integrated as the embedded system in a communication interface of the protection-requiring data processing facility.

13. Method according to claim 1, wherein the safety computer system is an integrated insertion card, or an integrated Personal Computer Memory Card International Association-card (PCMCIA-card) in the protection-requiring data processing facility.

14. Method according to claim 1, wherein the safety computer system is connected to the protection-requiring data processing facility.

15. Method according to claim 1, wherein a power supply of the safety computer system is effected by way of the protection-requiring data processing facility.

16. Method according to claim 1,
further comprising the step of only storing the data to be kept secret in the safety computer, the data to be kept secret including electronic keys or electronic signatures.

17. Method according to claim 1,
further comprising the step of running all of the data to be exchanged between the protection-requiring data processing facility and the network through the safety computer system.

18. Method according to claim 1, wherein a communication connection between the protection-requiring data processing facility and the embedded system is established separately from establishing a communication connection between the embedded system and the network.

19. Method according to claim 1, wherein the embedded system is adapted to carry out at least one of
  establishing a connection between the protection-requiring data processing facility and the embedded system by way of a Dynamic Host Configuration Protocol (DHCP) server installed on the embedded system, and
  establishing a connection between the embedded system and the network by way of a transparent Router/Virtual Private Network (VPN) installed on the embedded system.

20. A computer system for the execution of a method for the safeguarding of communication in a network according to claim 1, where the computer system is realized as an embedded system comprising embedded hardware and embedded software, and includes
  at least one means for data exchange with a protection-requiring data processing facility,
  at least one means for data exchange with the network and
  at least one means for at least one of monitoring and controlling the communication between the protection-requiring data processing facility and the network,
  where the data required for the correct functioning of the at least one means for monitoring and controlling are available on the computer system itself, and
  where said at least one means for monitoring and controlling comprises at least one of:
    a transparent router/VPN (IPsec),
    a Dynamic Host Configuration Protocol (DHCP),
    a Key management, and
    a remote control.

21. Computer system according to claim 20, the wherein means for data exchange is connectable with the protection-requiring data processing facility via a bus-system of the protection-requiring data processing facility and/or means for data exchange with the network as a network interface.

22. Computer system according to one of the claims 20 or 21, wherein the means for data exchange with the protection-requiring data processing facility comprises:
  a Personal Computer Memory Card international Association-bus (PCMCIA-bus), or a Peripheral Component Interconnect-bus (PCI-bus), or
a Universal Serial Bus-bus (USB-bus), or
a IEEE 1394-bus (Firewire).

23. Computer system according to claim 20, wherein the means for data exchange with the protection-requiring data processing facility comprises:
an RS-232 interface, or
an Ethernet interface, or
an Universal Serial Bus-interface (USB-interface).

24. Computer system according to claim 20, wherein the at least one means for data exchange with the network includes
a modem, and/or
a mobile telephone processor.

25. Computer system according to claim 20, wherein at least one means for monitoring and/or control of the communication comprises:
a system monitoring, and/or
an Internet Distribution System (IDS), and/or
an automatic update, and/or
a virus scanner, and/or
an intrusion detection system, and/or
a Public Key Management.

26. Computer system according to claim 20, wherein the computer system is a system on a chip.

27. Computer system according to claim 20, wherein the computer system is integrated in a cable or a card for network access or a chip for the network access.

28. Computer system according to claim 20, wherein the computer system is an insertion card, or a Personal Computer Memory Card International Association-card (PCMCIA-card).

29. Computer system according to claim 20, wherein the protection-requiring data processing facility is
a personal computer, or
a laptop, or
a network-compatible palmtop, or
a network-compatible telephone.

30. Computer system according to claim 20, wherein the embedded system is
a single board computer, or
a system on chip.

\* \* \* \* \*